July 16, 1963 — G. E. McDANIEL — 3,097,827
HOSE GUIDE
Filed July 24, 1961
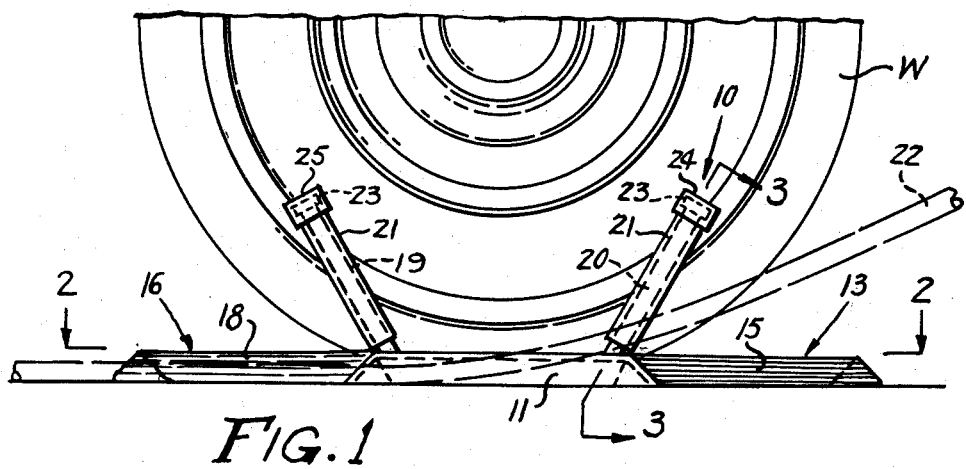
FIG. 1
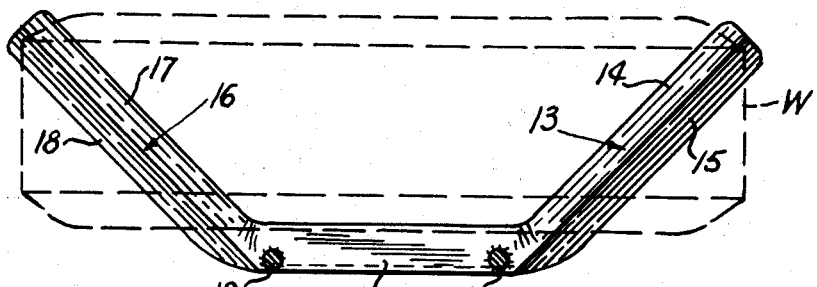
FIG. 2
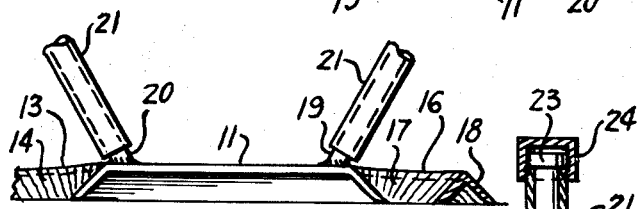
FIG. 4
FIG. 3
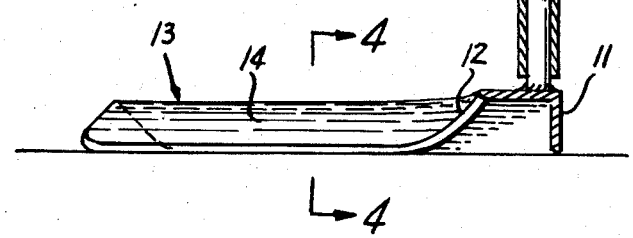
INVENTOR.
GERALD E. McDANIEL
BY Kimmel & Crowell
ATTORNEYS.

United States Patent Office 3,097,827  
Patented July 16, 1963

3,097,827  
HOSE GUIDE  
Gerald E. McDaniel, 125 Front St., Trumann, Ark.  
Filed July 24, 1961, Ser. No. 126,211  
4 Claims. (Cl. 254—190)

This invention relates to a hose guide and has as its primary object the provision of a device which is adapted to be associated with the wheel of a vehicle upon which work is being done in order to prevent the entanglement or wedging of a hose or power line under the wheel.

An additional object of the invention is the provision of such a device provided with rollers, which will protect the hose from wedging under the wheel, and permit the same to work around the car body.

A further object of the invention is the provision of a device of this character which may be readily and expeditiously positioned adjacent any or all wheels of a vehicle upon which work is being done.

Other objects reside in the combinations of elements, arrangements of parts, and features of construction, all as will be more fully pointed out hereinafter and disclosed in the accompanying drawing wherein there is shown a preferred embodiment of this invention.

In the drawings:

FIGURE 1 is a side elevational view of the device of the instant invention shown as applied to a vehicle wheel.

FIGURE 2 is a sectional view taken substantially along the line 2—2 of FIG. 1 as viewed in the direction indicated by the arrows, the wheel being indicated in dotted lines.

FIGURE 3 is an enlarged sectional view taken substantially along the line 3—3 of FIG. 1 as viewed in the direction indicated by the arrows; and FIGURE 4 is a sectional view, partially broken away, taken substantially along the line 4—4 of FIG. 3 as viewed in the direction indicated by the arrows.

Similar reference characters refer to similar parts throughout the several views of the drawing.

Having reference now to the drawing in detail, the device consists of a base generally indicated at 10 which has a front or outer portion 11, which is adapted to extend horizontally at the base of the wheel W. The inner side of the portion 11 is rounded as at 12 to accommodate the curvature of the wheel. An angularly disposed portion 13 extends from one end of the portion 11, and is inclined toward the wheel as at 14 in order to engage the periphery thereof closely. The opposite side is inclined as at 15, outwardly from the wheel. A second leg generally indicated at 16 extends outwardly at an angle from the opposite end of the portion 11, and has an inclined inner face 17 as well as a similarly but oppositely inclined outer face 18. The face 17 fits closely adjacent the wheel, and is inclined to permit the accommodation of wheels of various sizes.

A pair of spindles 19 and 20 extend upwardly from the extremities of front portion 11, being inclined forwardly and rearwardly, respectively, but extending in a plane perpendicular to the ground and parallel to the outer surface of the wheel 12. Each spindle has rotatably mounted thereon a sleeve or pipe section 21 and 22, respectively, which is freely rotatable thereon, and serves as a guide or roller for the hose 22 (see FIG. 1).

Each spindle is provided with a cap 23, as best seen in FIG. 4 which overlies the top of its associated pipe to prevent dislodgment thereof, and an end cap 24 and 25 is positioned on each of the pipe sections 21.

The arrangement is thus such that in working around the vehicle an individual washing a car, or a body repairman or a paint sprayer or the like, may carry his hose or power line completely around the vehicle without the possibility of its becoming wedged or entangled beneath the wheels, since the tapered edges of the portions 13 and 16 preclude close engagement of the hose under the wheels at sharp angles while the rollers 21 permit the same to be moved smoothly around the vehicle.

From the foregoing it will now been seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A hose guide adapted to be positioned adjacent a vehicle wheel comprising a base including a front portion, a pair of legs divergingly extending from opposite ends of said front portion in the same plane, spindles, having sleeves rotatably mounted thereon, secured to opposite ends of said front portion and extending angularly upwardly therefrom, said front portion being in abutting relation to the wheel and said legs having portions thereof engageable with the periphery of the wheel at spaced points when the hose guide is in an operative position, and said spindles being in parallel spaced relation to the side of the wheel.

2. A hose guide as defined in claim 1 wherein, said spindles having sleeves rotatably mounted thereon which extend upwardly from said front portion reside in a plane perpendicular to the plane of said front portion and said pair of legs, and in diverging relation to each other.

3. A hose guide as defined in claim 1 wherein, the portions of said legs engageable with the vehicle wheel comprise inclined inner face portions having a configuration substantially complementary to the periphery of the wheel.

4. A hose guide adapted to be positioned adjacent a vehicle wheel comprising a base including a front portion, a pair of legs divergingly extending from opposite ends of said front portion in the same plane, a pair of spindles secured to opposite ends of said front portion and extending upwardly therefrom in diverging relation and in a plane perpendicular to the plane of said front portion and said pair of legs, a sleeve rotatably mounted on each of said spindles, a cap on the free end of each of said spindles to prevent dislodgment of said sleeves therefrom, said front portion being in abutting relation to the side of the vehicle wheel when said hose guide is in an operative position, and said pair of legs each including inclined inner faces having a configuration substantially complementary to the periphery of the wheel and adapted to engage the same at spaced points thereon.

References Cited in the file of this patent

UNITED STATES PATENTS

| | | |
|---|---|---|
| 1,188,538 | Greene et al. | June 27, 1916 |
| 2,603,432 | Paulsen | July 15, 1952 |